July 28, 1925.
J. J. GORE
1,547,746
FISHLINE DOBBER
Filed Nov. 8, 1922
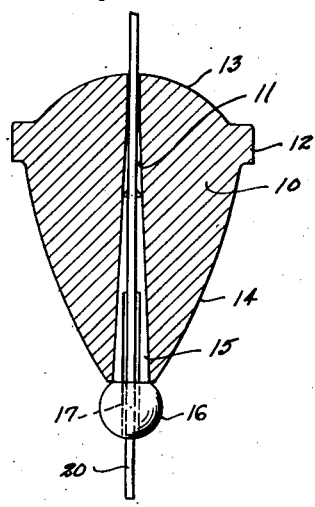
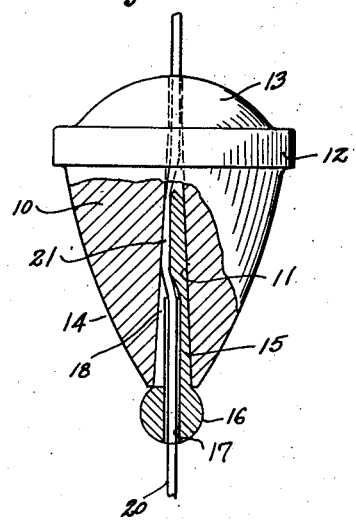
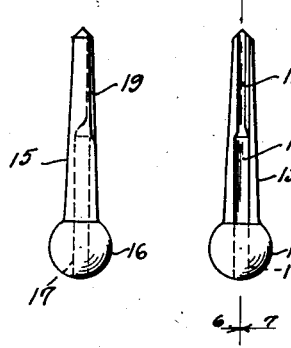
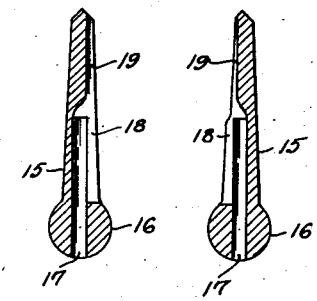
INVENTOR
John J. Gore
BY
Wooster & Davis
ATTORNEYS.

Patented July 28, 1925.

1,547,746

UNITED STATES PATENT OFFICE.

JOHN J. GORE, OF DANBURY, CONNECTICUT.

FISHLINE DOBBER.

Application filed November 8, 1922. Serial No. 599,668.

*To all whom it may concern:*

Be it known that I, JOHN J. GORE, a citizen of the United States, residing at Danbury, county of Fairfield, State of Connecticut, have invented an Improvement in Fishline Dobbers, of which the following is a specification.

This invention relates to fishing floats or dobbers and has for an object to provide a float or dobber which will be visible at night.

It is also an object of the invention to provide an improved and simple means for securing the float or dobber to a line, and one which may be easily adjusted thereon and firmly and quickly secured in adjusted position.

With the foregoing and other objects in view, I have devised the improved construction illustrated in the accompanying drawing, in which—

Fig. 1 is a longitudinal section through the dobber.

Fig. 2 is a partial side elevation and a partial sectional view looking from the right of Fig. 1.

Fig. 3 is a top plan view of the line securing means.

Fig. 4 is a side elevation thereof.

Fig. 5 is a front view thereof looking from the right of Fig. 4.

Fig. 6 is a central longitudinal section looking in the direction of arrows 6—6 in Fig. 5, and Fig. 7 is a similar view in the direction of arrows 7—7 of Fig. 5.

The dobber comprises a float or body member 10 provided with a longitudinal opening 11 extending therethrough, this opening being tapered for a portion of its length as shown. The body is preferably provided with a flange 12 and is substantially dome shaped above this flange, as shown at 13, and substantially conical below this flange, as shown at 14. The body is preferably covered with a luminous paint or a paint that will be visible in the dark to facilitate night fishing, or if preferred the upper portion only above the flange may be covered with luminous paint. As the line passes vertically through the longitudinal axis of the body the float will remain upright in the water presenting a neat appearance and rendering the top portion thereof easily visible, so that this form of float is especially adaptable for the use of luminous paint on the upper portion thereof. The flange 12 being in a plane at right angles to the line offers considerable resistance to the drawing of the float downwardly into or through the water, thus assisting in the securing and holding of the fish.

The improved means for securing the float or dobber to the line comprises a tapered plug 15 having an enlarged head 16, the taper of the plug being substantially that of the opening 11 through the body or float member 10, and is adapted to tightly fit the same. This plug is provided with a longitudinal opening 17 extending from the outer end of the head throughout a portion only of the body of the plug and issues through the side thereof, as indicated at 18. The remaining portion of the plug is provided with a longitudinally extending groove 19 communicating with the opening 17. The line is passed through the opening 17 issuing from the side thereof and resting in the groove 19 and then extends through the opening 11 in the float. By inserting the plug in the tapered portion of the opening 11 the line 20 is securely clamped against the inner wall of this opening and in the groove 19, as shown at 21, securely fastening the float to the line. If it is desired to adjust the float on the line all that is necessary is to pull the plug outwardly somewhat to release the line, move the float and plug to the desired position on the line and then again press the plug tightly in the opening 11 to secure the float in its adjusted position.

It will be apparent from the foregoing description that the float is very simple in construction and neat in appearance and that it may be easily secured to the line and adjusted thereon as desired. Also that it is especially adapted for night fishing, and does not require the complicated and unreliable electric lighting sometimes employed to make a float visible in the dark.

Having thus set forth the nature of my invention, what I claim is:

1. A fish line float comprising a body member having a flange portion with the surface above said flange covered with luminous material and the portion below said flange substantially conical, said body being provided with an opening extending longitudinally therethrough for the passage of the line, and a tapered plug in said opening, said plug having a longitudinal opening extending from its larger end for said line, said opening terminating at one side of the plug, the remainder of the body of the plug being adapted to clamp the line in the opening in the body member.

2. A fish line float comprising a body member having a continuous, tapered opening extending from the bottom of the member and with its larger end at said bottom, and a substantially solid, integral, tapered plug seated in said opening, said plug having a longitudinal opening extending from the larger end thereof throughout a portion of its length, said plug being also provided with a groove in the side thereof leading from the other end of the opening, said groove being tapered toward the smaller end of the plug so that a cord will be bound between the inner wall of the groove and the inner wall of the opening in the body member.

In testimony whereof I affix my signature.

JOHN J. GORE.